Jan. 1, 1935. J. E. O'LAUGHLIN 1,986,010
FITTING
Filed Oct. 5, 1933

J. Elmer O'Laughlin,
Inventor,
Delor F. Haynes,
Attorney.

Patented Jan. 1, 1935

1,986,010

UNITED STATES PATENT OFFICE 1,986,010

FITTING

John Elmer O'Laughlin, Milwaukee, Wis., assignor to Mueller Brass Co., Port Huron, Mich., a corporation of Michigan Application October 5, 1933, Serial No. 692,283

3 Claims. (Cl. 285—115)

This invention relates to fittings, and with regard to certain more specific features, to fittings adapted to join lengths of pipe, rod, and the like.

Among the several objects of the invention may be noted the provision of a fitting of the class described which is used with improved facility to effect a joint of the soldered type; a fitting which requires the addition of no extraneous solder to complete a joint; a fitting which provides for improved spreading of the solder in the joint as it is made; a fitting which, in the finished joint, contributes to form a smooth, unbroken inner surface; and a fitting of the class described which is readily manufactured without expensive forming operations, etc. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a longitudinal cross section of a fitting embodying the present invention;

Similar reference characters indicate corresponding parts throughout the several views of the drawing.

The present invention is concerned primarily with pipe and rod fittings of the type wherein the joint of fitting and pipe or fitting and rod is effected by a film of solder which has been positioned by capillarity as between the inner wall of the fitting and the outer wall of the pipe, or rod. Fittings of this general type are shown, for example, in Charles A. Hill Patent 1,776,352. The present invention offers a fitting of this general type in which the solder or other sealing material used to effect the seal in the joint is pre-inserted or pre-positioned in the fitting, in such a manner that the introduction of the pipe or rod end in the course of making the joint is helpful in initiating the proper capillary spreading of the solder within the joint.

Figure 1:
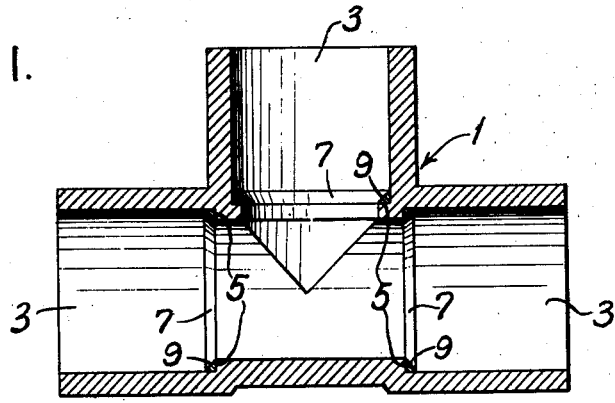
Figure 2:
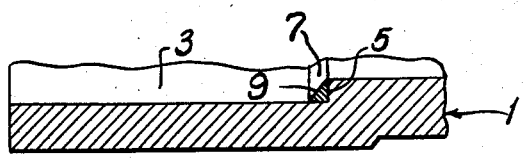
Fig. 2 is an enlarged fragment of Fig. 1.

Referring now more particularly to Fig. 1, there is illustrated at numeral 1 a fitting, comprising, for purposes of illustration, a T. It will be understood, of course, that the invention refers to any form of fitting, such as couplings, nipples, elbows, return bends, crosses, caps, valve ends, etc., and is by no means limited to the T shown. The fitting 1 includes three sockets 3, which are cast, machined, broached, reamed, bored, or otherwise formed to accurate cylindricity, with the diameters suitably proportioned for the size of pipe or rod to be joined. In general, it may be stated that the diameter of the sockets 3 is the order of a few thousandths of an inch greater than the outer diameter of the pipe or rod to be fitted. Each socket 3 terminates inwardly in an annular shoulder 5, which shoulder 5 is desirably equal in width to the thickness of the pipe walls to be inserted.

Bottomed on the shoulders 5, rings 7 of sealing material such as solder are provided. The rings 7 are triangular in cross section, and are so shaped as to fit directly into the angle between the shoulders 5 and the sockets 3 and leave a sloping exposed face 9 which effectually constitutes a bottoming inner taper for the fitting. The rings 7, if made of the usual soft solder, can be formed by stamping, or they may be otherwise formed. They are desirably inserted in position in the fitting by some pressure operation, so that their tendency to come loose from the fitting is minimized.

Figure 3:
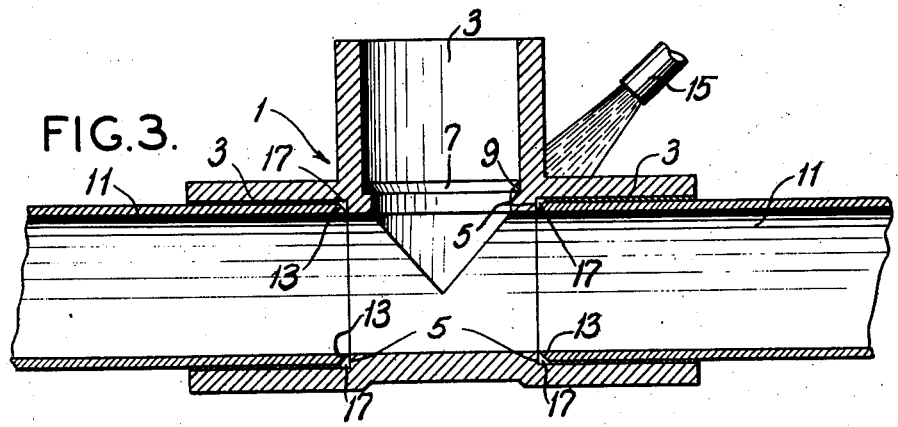
Fig. 3 is a longitudinal cross section of a joint utilizing the fitting of Fig. 1; and, Fig. 4 is an enlarged fragment of Fig. 3.
Figure 4:
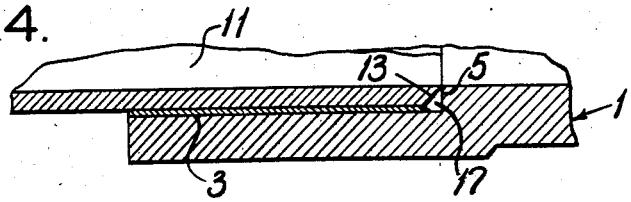

Figs. 3 and 4 show how a joint is assembled from the fitting as thus described. To make the joint, it is first desirable that the pipe 11 (or rod) be suitably tapered or bevelled at its end, as indicated by numeral 13. This bevelling is not altogether necessary, but it is to be recommended as it furthers the end of proper distribution of the solder in the finished joint, and likewise tends to prohibit solder from dropping into the interior of the fitting. The end region of the pipe 11, for a length equal to the depth of the socket 3, may in some cases be advantageously tinned, or precoated with a light film of solder. Such pretinning is particularly desirable with the larger sized pipes and fittings. The interior of the socket 3 may also be pretinned, preferably before the ring 7 is positioned therein.

The next step comprises inserting the pipe end 11 (pretinned or not) into the socket 3 until its beveled end 13 bottoms on the solder ring 7. As the solder of the ring 7 is yet cold, there is a positive engagement and further insertion is prevented. Heat is now applied to the exterior of the fitting, as by playing the flame from a blow torch 15 around the fitting in the region of the ring 7. Soon the solder ring 7 commences to melt. At this time, a constant pressure is maintained on the pipe 11 in a direction tending to force it still further into the socket 3. The effect of this pressure, as applied by the bevel 13 on the sloping face 9 of the solder ring 7, is to force the now molten solder back out of the base of the socket 3 and into the annular space between the pipe 11 and the socket 3. As soon as the solder gets into this annular space, on account of its dimensions, it is drawn by capillary attraction phenomena to spread throughout the annular space. Finally the pressure on the pipe 11, in connection with the capillarity, is sufficient to draw substantially all of the solder from the base of the socket into the annular space, leaving such base region substantially hollow, as indicated by numeral 17 in Figs. 3 and 4. The signal that such a condition has been achieved is customarily the appearance of the solder at the external end of the socket 3. Thereupon the fitting is allowed to cool, and the solder solidifies to seal the joint together.

The particular advantages of the present invention have already been indicated in part. One of the principal advantages is the manner in which pressure as applied to the entering pipe end serves to initiate the capillary spreading of the solder by forcing the molten solder into the capillary region. Another advantage is found in the fact that, when the joint is first assembled, and the solder is cold and relatively hard, the coaction of the sloping solder face 9 and the beveled end 13 of the pipe effects a desirable centering action on the pipe, thereby making the annular capillary space of uniform thickness and thereby assuring uniform capillary distribution of the solder when it is melted later.

The beveled end 13 of the pipe 11 contributes considerably to the success of the present invention, although it is not necessary for satisfactory operation. However, since it requires no great amount of additional work in making the joint to do the bevelling of the pipe end (this may be accomplished, for example, by a suitable pointer of the type generally used for pointing dowel ends), it is distinctly advantageous from the practical standpoint to carry out this feature.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A fitting for pipes, rods, and the like, comprising a member having a socket, an annular shoulder inwardly terminating said socket, and a ring of sealing material seated on said shoulder, said ring having a face shaped to constitute an inward taper when considered with respect to said socket.

2. In combination, a fitting having a socket, a shoulder inwardly terminating said socket, a ring of sealing material seated on said shoulder, said ring of sealing material having a face shaped to constitute an inward taper when considered with respect to said socket, and an entering member adapted to fit within said socket, said entering member having its entering end beveled whereby to engage said face of said sealing material ring.

3. In combination, a fitting having a socket, a shoulder inwardly terminating said socket, a ring of heat-liquefiable sealing material seated on said shoulder, said ring of sealing material having a face shaped to constitute an inward taper when considered with respect to said socket, and an entering member adapted to fit within said socket and leave an annular space between said socket and said entering member, said annular space being of a dimension suitable for exerting capillary attraction on said sealing material when liquefied, said entering member having a tapered end adapted to engage the said face of said ring of sealing material to force said sealing material, as it is liquefied, into said annular space.

J. ELMER O'LAUGHLIN.